United States Patent Office 2,722,999
Patented Nov. 8, 1955

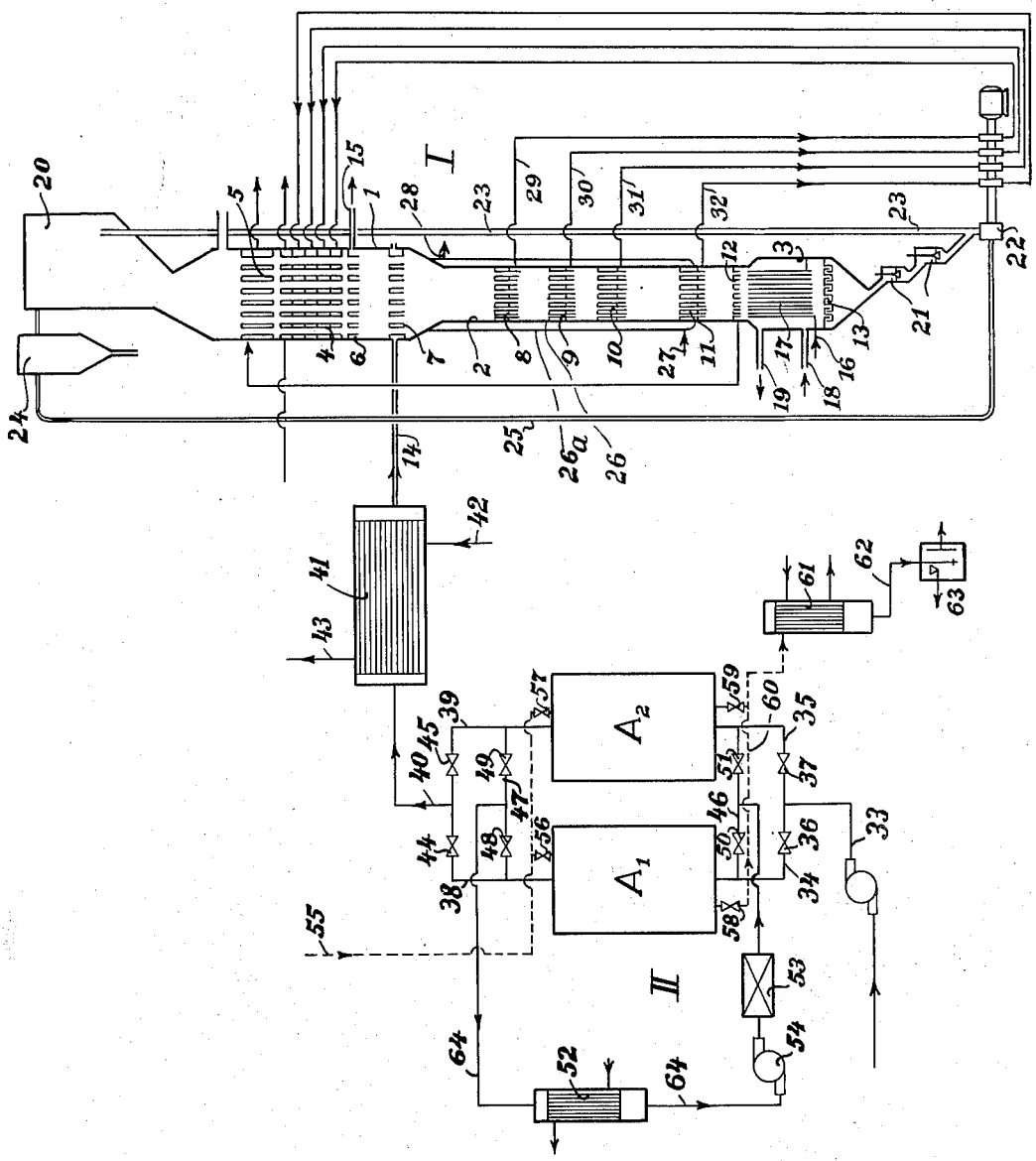

2,722,999

PROCESS FOR THE SEPARATION OF HYDROCARBONS FROM GASEOUS MIXTURES BY ADSORPTION

Karl Bratzler, Frankfurt am Main, and Alfred Engelhardt, Bad Homburg, vor der Hohe, Germany, assignors to Laboratorium fur Adsorptionstechnik G. m. b. H., Bad Homburg, vor der Hohe, Germany Application August 21, 1951, Serial No. 242,994

1 Claim. (Cl. 183—114.2)

This invention relates to an improved process for the separation of hydrocarbons from gaseous mixtures by means of adsorbents, as, for instance, activated carbon.

More particularly, this invention relates to new methods by which hydrocarbons of low boiling point may be separately obtained from gaseous mixtures by adsorption in a continuous process.

Increasing use of continuous adsorption is being made lately in the art of separating hydrocarbons from gases.

In carrying out the known continuous process, adsorption plants are used consisting of one or more adsorption columns. The columns comprise an adsorption zone, a fractionating zone, and a desorption zone, arranged one after the other, preferably under each other. An adsorption means circulates continuously through said zones, in the order named heretofore, i. e. through the adsorption zone, the fractionating zone and the desorption zone.

The process is carried out by introducing in counterflow in the adsorption zone, the gas mixture to be treated; into the desorption zone a desorption means, for instance water-steam; and in the fractionating zone, the gas-steam mixture emanating from the desorption zone.

The gas-steam mixture is decomposed into fractions under the action of the adsorption means flowing to meet it, when passing through the fractionating zone. Said fractions can be drawn off separately from their fractionating chambers.

The non-continuous separation of hydrocarbons from gaseous mixtures, however, is the hitherto mainly used process in the art.

According to this process the gas mixture to be separated is passed through one or more adsorbers containing a static layer of an adsorption means. When the gas mixture is passed through the layer of adsorption means, the material to be recovered is taken up by the adsorption means and the gas mixture is passed through the adsorption means until its adsorptive power is exhausted, i. e. until the adsorption means is saturated. Hereupon the adsorber is removed from the gas stream and replaced by another, fresh, adsorber. While the fresh adsorber is being charged in the manner described heretofore, the charged adsorption means of the first adsorber is freed of the adsorbed material by steaming or in another suitable manner. In this way, the adsorbers are alternately charged and regenerated.

The continuous process, as compared with the discontinuous process, presents the advantage that the gas components to be obtained may be drawn off from the fractionating zone as high-percentage fractions. In the continuous process, the adsorption means circulating through the columns will always be so reactivated in the desorption zone, that, on returning to the adsorption zone, it possesses the high activity required for the separation of the hydrocarbons. In most cases, however, the gases contain, although in small quantities, hydrocarbons with higher boiling points, as, for instance, pentane or hexane, which, under the conditions under which the lower boiling materials are desorbed, are not removed from the adsorption means. Accordingly, on every passage of the adsorption means through the desorption zone, such higher boiling hydrocarbons remain, in the known continuous process, in the adsorption means, and its adsorption and separating power constantly decreases for this reason.

In order to avoid these disadvantages, it has already been suggested to continuously by-pass a part of the flow of adsorption means which is then regenerated with stronger means, for instance highly superheated steam at about 500° C., and thereupon returned to the main stream. This measure, however, is not very economical as the adsorption means to be regenerated usually is charged only to a very low degree with hydrocarbons of higher boiling points than butane, so that it is at the most only lightly weakened and the treatment with superheated steam consequently results in a disproportionately high consumption of energy. Moreover, this treatment involves the disadvantage that a part of the higher boiling point hydrocarbons adsorbed by the adsorption means are cracked at the high regeneration temperatures, so that carbon is deposited in the active capillaries of the adsorption means which leads to permanent injury of the adsorption means and reduces its activity.

It is the object of this invention to eliminate the disadvantages of the known processes and to provide a method in which the separation of low boiling point hydrocarbons is improved and better yields are obtained.

According to the present invention, the harmful effect of high boiling point hydrocarbons in the continuous process of producing low boiling point hydrocarbons described heretofore is avoided by passing the hydrocarbon mixtures to be treated first through a filter charged with adsorbent material, for instance activated carbon. Only hereafter the gaseous material emanating from said preliminary adsorbing filter is passed through a continuously operating adsorption apparatus in order to obtain separately the different low boiling point hydrocarbons.

By this method the hydrocarbons with boiling points higher than, for instance, butane are eliminated from the gases practically completely before the gases enter the continuously operating plant. The charge of adsorption-means provided in the pretreatment filter can, on exhaustion, be regenerated and then used again. It may also be used only once and then removed, if an inexpensive material is used as adsorption means. As a pretreatment filter according to the present invention, it is advisable to use a discontinuously operating adsorption equipment with two or more adsorbers, of which alternately one adsorber, or a part of the equipment, is charged until the pentane or the hydrocarbon with a boiling point next higher than butane is taken out, whereas the other adsorber or part of the equipment is being regenerated by treatment with steam.

In order to avoid fluctuating temperature conditions with their harmful effects in the continuously operating adsorption plant, it is advisable to bring the gas issuing from the preliminary stage to the optimum working temperature for the continuously operating adsorption plant before it enters the latter. Accordingly it is advisable to insert a cooling device, between the discontinuously and the continuously operating equipment, in which the gas issuing from the preliminary stage, at a temperature usually higher than desirable is cooled to such an extent that in the subsequent equipment the desired adsorption temperature prevails.

In the accompanying drawing, as an example a preferred embodiment of a plant for carrying out the process of the invention is schematically shown.

No. I designates a continuously operating installation and II is the discontinuously operating device placed before installation I according to the invention.

The continuously working plant I consists of the adsorber 1, the fractionating column 2, and the desorber 3. In the upper part of the adsorber, cooling elements 4 and above these heating elements 5 are provided in known manner. At the gas entrance and exit spots on the inside of the column, intermediate perforated bottoms 6, 7, 8, 9, 10, 11, and 12 are arranged over which the adsorption means proceeds from one treating chamber downward to the other and over which the gases proceed from the bottom to the top through the different chambers of the column.

The introduction into the adsorber 1 of the gases to be treated takes place via pipe 14 and their exit from the adsorber through pipe 15. The introduction of the desorption means, for instance steam, into the desorber 3 takes place at 16. 17 is a device for indirect heating of the desorber. The heating means enters the heating device in the direction indicated by arrow 18 and exits from the heating device in the direction of arrow 19. 20 is the feed container for the adsorption means, which, via a draw-off grid 13 and gas locks 21, leaves the column again at the bottom, and by means of a blowing device 22 is circulated back to the feed container via pipe 23. Via a dust remover 24 and the pipe 25 the gas returns to the blower 22. 26 designates cooling elements arranged in the fractionating column 2. In addition, a cooling jacket 26a is provided. The cooling means enters the cooling device at 27 and exits at 28. 29, 30, 31, and 32 are pipes through which the fractions are drawn off separately from the fractionating column.

The discontinuous plant II consists of the adsorbers $A_1$ and $A_2$. The introduction of the raw gas to the adsorbers takes place via pipe 33 and the branch pipes 34 and 35. In the pipes 34 and 35 valves 36 and 37 are provided, so that the gas can be delivered either to adsorber $A_1$ or adsorber $A_2$, or to both, as desired. The exit of the gases from the adsorbers $A_1$ and $A_2$ takes place via the pipes 38 and 39. From these the gas passes into the pipes 40 and 14 which connect the discontinuously and the continuously operating parts. Between the pipes 40 and 14 a cooling device 41 is provided, in which the cooling means enters at 42 and from which it exits at 43. In the pipes 38 and 39, just as in the pipes 34 and 35, valves 44 and 45 are provided by means of which the exit pipe 38 or 39, or both, may be closed, as desired.

Between the pipes 34 and 35 a connecting pipe 46, and between the pipes 38 and 39 a connecting pipe 47, is provided. Furthermore valves 50, 51 and valves 48, 49 are provided in these pipes respectively. These intermediary pipes with their valves make it possible to direct a cooling and/or dry gas in repeated circulation through the adsorbers $A_1$ and $A_2$, whereby the cooling gas can be intermediately cooled in a cooler 52 and the dry gas intermediately heated in a heater 53. 54 is the circulating blower.

The desorption means, for instance steam, destined to drive out the matter adsorbed, is introduced via pipe 55 and from there enters the adsorbers either via valve 56 or valve 57 or both. The exit of the gas-steam mixture takes place via valves 58 and 59 through pipe 60. 61 designates a condenser in which the gases or vapors are liquified by cooling. From the condenser the condensate passes, via pipe 62, to a water separator 63.

The process as invented is carried out in the equipment shown in the drawing, as follows:

First, the valves 36 and 44 of the discontinuously working part of the plant are, for instance, opened, while all other valves of this plant remain shut. As a result, raw gas flows into adsorber 1 via pipe 33, valve 36 and pipe 34. From there the gas flows via pipe 38, valve 44, and pipe 40, cooler 41 and pipe 14 to the adsorber 1 of the continuously operating equipment I. On passing through the adsorber $A_1$, the hydrocarbons with boiling points higher than for instance butane are taken up by the adsorption means in said adsorber, so that the gas flowing to adsorber 1 of the continuously operating equipment is practically free of hydrocarbons with higher boiling points. The passage of raw gas through adsorber 1 of the discontinuously operating plant is kept up until hydrocarbons with higher boiling points appear in the gas exit pipe. When that occurs, the valves 36 and 44 are shut and the valves 37 and 45 opened in their stead, so that the raw gas now enters adsorber $A_2$ via valve 37 and pipe 35 and from there, via pipe 39, valve 45, pipe 40, cooler 41 and pipe 14 and then flows to adsorber 1 of the continuously operating part. At the same time, the valves 56 and 58 in the desorption pipe 55 are opened. Consequently, while adsorber $A_2$ is being charged, steam flows in downward direction through the adsorption means of adsorber $A_1$ which brings about desorption of the matter taken up by the adsorption means. The gas-steam mixture from the steaming process exits from the pipe 60 into condenser 61, is here precipitated and the condensate then passes into the water remover 63.

After the adsorber $A_1$ has been steamed, it is dried and cooled while adsorber $A_2$ is still being charged. For this purpose, the valves 56 and 58 are shut, and in their stead, valves 48, 49, and 50 are opened. Consequently, exhaust gas free of adsorbable components flows from the adsorber $A_2$ via circulating pipe 64, cooler 52 and heater 53 into adsorber $A_1$. For the purpose of drying the adsorption means in adsorber $A_1$, the exhaust gas flowing in circulation is heated in heater 53 and then, when the drying is concluded, the heater 53 is cut off and intermediary cooling takes place in cooler 52.

When the adsorption means of adsorber $A_2$ is charged to capacity and the adsorption means of adsorber $A_1$ has been steamed, dried, and cooled, the valves 37, 45, 48, 49, and 50 are shut and in their stead valves 36, 44, 57, and 59 are opened i. e., adsorber $A_1$ is now switched to charging and adsorber $A_2$ to steaming and later drying and cooling. In this manner, the discontinuous equipment is operated by alternately switching the adsorber to charging and steaming.

The gas free of higher boiling point hydrocarbons entering the continuously operating equipment I via pipe 14, enters adsorber 1 at the bottom and leaves it free of recoverable components via pipe 15. From the adsorber 1 the charged adsorption means goes downward through the grid-like intermediary perforated bottom 7 and reaches the fractionating column 2, whence, passing the perforated bottoms 8, 9, 10, 11, and 12, it finally enters the desorber 3.

Here steam is directed in counterflow to the adsorption means via pipe 16, by which the adsorbed matter is driven out of the adsorption means. The thus formed gas mixture flows upward out of the desorber 3 and in the fractionating column 2 comes into contact with the downward moving charged adsorption means in such a manner that the adsorbed matter is displaced according to the degree of its adsorbability, which in turn depends on the molecular weight, and forms layers in the fractionating column. The fractions are drawn off from the fractionating chambers separately via pipes 29, 30, 31, and 32. The adsorption means leaves the desorber via the gas locks 21 and is propelled by the blast 22 via pipe 23 upward again into the feed container 20. The conveyor air is freed of matter carried along in the dust remover 24 and thereafter flows via pipe 25 back to the blower 22.

The advantage of the procedure as invented and described is due to the fact that the adsorption capacity for hydrocarbons with boiling points higher than that of butane is completely utilized in the pretreatment-filter or the discontinuously operating equipment and that the continuously operating adsorption column is thereby relieved. In this way, the adsorptive power of said continuously working adsorption column remains practically unreduced. It retains a higher gas separating power for the hydrocarbons with low boiling points, and therefore provides a higher yield. By eliminating the damaging of the carbon, the amount of adsorptive means used is considerably reduced. The regeneration of the pretreatment-filter can be carried out with low temperature steam, preferably exhaust steam, i. e. at low energy cost and is only required at long intervals. Cracking of the adsorbed hydrocarbons is avoided at this low regeneration temperature, so that there is no permanent damage to the adsorption means in the pre-adsorber by deposits of decomposition products. The pretreatment-filter or the advance equipment at the same time purifies the gas to be treated of resin-forming elements or the like, such as hydrogen sulphide and similar damaging matter.

The higher achievement, in respect of yield and gas separation, of a continuously operating plant working with a pre-adsorber as compared with one without pre-adsorber, may be seen from the following figures obtained in actual practice.

A coking oven gas which was pre-washed in a wash-oil plant and still had a benzol content of 2.6 g./m.$^3$ was processed. The gas furthermore contained:

1.87% by volume__ 23.2 g./m.$^3$ ethylene.
0.92% by volume__ 12.5 g./m.$^3$ ethane.
0.27% by volume__ 4.1 g./m.$^3$ propylene and hydrocarbons with higher boiling points.
2.05% by volume__ 4.0 g./m.$^3$ carbon dioxide.

The processing took place in a plant as described above and shown in the drawing. A longer test run with advance treatment in a discontinuously operating equipment (II) and a further test run without advance treatment in the discontinuously operating equipment were made. In the first instance, the activated carbon in the continuously operating equipment (I) showed no appreciable decrease of adsorption power after an operating period of six weeks. On the other hand, in the second instance the adsorptive power of the activated carbon had fallen considerably after 5 days. The following figures for instance for the C$_2$-hydrocarbons were observed:

*Adsorption until break-through*

Percent by weight
At the beginning when working with fresh carbon__ 1.61
After 6 weeks operation with advance equipment II__ 1.60
After 5 days operation without advance equipment II _____ 1.21

With the same amount of raw gas passing through, a yield of 98% of ethylene was noted when working with pre-adsorber and of 57% of ethylene when working without pre-adsorber.

As regards separating power, an ethylene fraction, and ethane fraction, and a fraction of propane and hydrocarbons with higher boiling points were drawn off from three spots, one above the other (29, 30, 31). In the last mentioned fraction, when operating without pre-adsorber, there was also contained a part of the benzol. The fractions showed the following contents of the components predominating in the fraction:

| Fraction | When operating with pre-adsorber, percent by volume | When operating without pre-adsorber, percent by volume |
|---|---|---|
| ethylene | 88.9 | 83.0 |
| ethane | 86.2 | 79.4 |
| propylene and higher boiling point hydrocarbons | 79.5 | 77.4 |

The invention also offers the advantage that for achieving certain effects different adsorption means and/or different methods may be used in the two stages of operation. Thus, e. g. various adsorption means selected according to their structure, grain size, or other characteristics may be used. For instance, in the first stage, in which the materials with higher boiling points are separated out, an adsorption means with large pores, which is therefore susceptible of easier desorption, can be used. Or a coarse-grained adsorption means may be used for the first stage and a fine-grained one for the second, as is suitable for the working condition in the individual stages.

Furthermore, if in the pre-adsorber material difficult to desorb, as for instance, hydrocarbons with high boiling points, were predominantly separated out, the regeneration can be made more effective by treating the carbon layer in the pre-adsorber with a suitable extraction means before steaming it.

While we have described preferred embodiments of our invention, it will be understood that we do not limit ourselves in any particular embodiment.

Obviously, various modifications of our process may be made within the scope of the following claim.

We claim:

In an adsorption process for the selective separation of low-boiling hydrocarbons from gases containing said low-boiling hydrocarbons admixed with higher-boiling hydrocarbons, wherein said gases are pre-treated for the removal of said higher-boiling hydrocarbons and the residue of low-boiling hydrocarbons is passed into an adsorption zone, an adsorbent is continuously moved in countercurrent direction to said residue through said adsorption zone and then successively through a fractionating zone and a desorption zone, steam is passed into said desorption zone for desorption of adsorbed gases, the gas steam mixture leaving said desorption zone enters said fractionating zone for contact with said adsorbent from said adsorption zone, and said frationating zone is tapped to draw off fractions of said low-boiling hydrocarbons; the improvement in said pre-treatment which comprises the steps of introducing said gas mixture in upward direction alternately into one of a plurality of further adsorption zones each provided with a static adsorbent bed having coarser particles and larger pores than said moving adsorbent, whereby the higher-boiling hydrocarbons are selectively adsorbed while the low-boiling hydrocarbons are passed on for further processing, terminating the flow of gas to said one further adsorption zone when the adsorbent bed is saturated with higher-boiling hydrocarbons and transferring said gas flow to another of said further adsorption zones, passing steam downwardly through said one further adsorption zone for regeneration of the adsorbent bed, whereby hydrocarbons liberated from the top of said adsorbent bed during said regeneration aid said steam in liberation of hydrocarbons from the bottom of said adsorbent bed where hydrocarbons are more tenaciously retained, drying said regenerated adsorption bed and cooling the latter, and then resuming introduction of gases into said one further adsorption zone while said other further adsorption zone is being regenerated.

References Cited in the file of this patent

UNITED STATES PATENTS

| | | |
|---|---|---|
| 1,439,451 | Seibert et al. | Dec. 19, 1922 |
| 1,595,683 | Burrell et al. | Aug. 10, 1926 |
| 1,610,288 | Jones et al. | Dec. 14, 1926 |
| 1,616,242 | Voress et al. | Feb. 1, 1927 |
| 1,934,075 | Lewis | Nov. 7, 1933 |
| 1,948,779 | Abbott et al. | Feb. 27, 1934 |
| 2,519,343 | Berg | Aug. 22, 1950 |
| 2,519,344 | Berg | Aug. 22, 1950 |
| 2,519,873 | Berg | Aug. 22, 1950 |
| 2,535,902 | Dailey, Jr. | Dec. 26, 1950 |
| 2,632,726 | Ringham et al. | Mar. 24, 1953 |

OTHER REFERENCES

"Adsorption," by C. C. Mantell, McGraw-Hill Book Co., 1945, page 11.